A. B. GREENFIELD.
PAIL.
APPLICATION FILED NOV. 13, 1915.

1,263,231.

Patented Apr. 16, 1918.

Witnesses
J. H. Crawford

Inventor
A. B. Greenfield,
By Victor J. Evans
Attorney

UNITED STATES PATENT OFFICE.

ANTHONY B. GREENFIELD, OF REGAN, NORTH DAKOTA.

PAIL.

1,263,231. Specification of Letters Patent. Patented Apr. 16, 1918.

Application filed November 13, 1915. Serial No. 61,305.

*To all whom it may concern:*

Be it known that I, ANTHONY B. GREENFIELD, a citizen of the United States, residing at Regan, in the county of Burleigh and State of North Dakota, have invented new and useful Improvements in Pails, of which the following is a specification.

My invention relates to pails, and has particular application to milk pails.

The principal object of my invention is to provide a milk pail having roughened surfaces on the outer side walls to facilitate the operator in gripping the bucket to prevent the slipping of the same during the milking operation.

Another object of my invention is to provide a device of this character which may be attached to any milk pail and which is so constructed as to prevent the roughened surface from injuring the operator's knees or tearing his trousers.

With the above and other objects in view, the invention consists in the features of construction and combination and arrangement of parts hereinafter described and claimed, reference being had to the accompanying drawings, in which:

Figure 1:
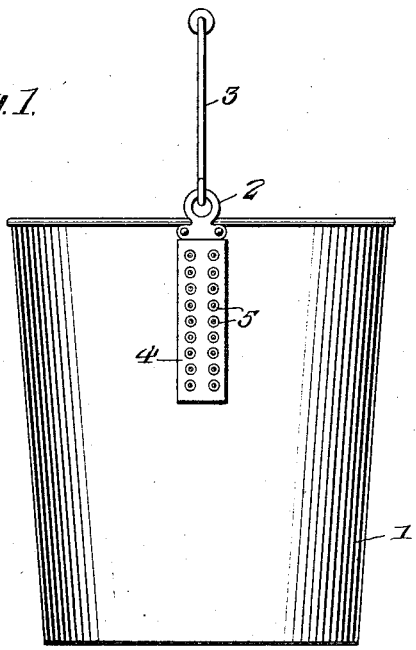
Figure 1 is a side elevation of my device.
Figure 2:
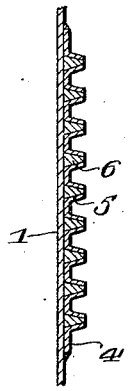
Fig. 2 is a fragmentary vertical section of the bucket.

Referring to the drawings in detail, 1 represents the pail, of any well known construction, and which is preferably formed of metal and is provided with the usual ears 2 to which the handle 3 is swingingly mounted. Arranged diametrically to the side wall of the pail 1, in any suitable manner, such as soldering, and disposed preferably below the ears 2, are gripping plates 4. In the present instance I have shown the gripping plates elongated and provided with a series of perforations 5, the perforations being formed in such a manner as to dispose the roughened walls thereof on the outer surface of the plate. In order to prevent the sharp edges of the perforations from injuring the operator's knee or tearing his trousers, I fill the perforations, or the chambers formed between the wall of the pail and the walls of the perforations, with solder 6, or any suitable material, whereby the perforations are substantially closed and at the same time present a roughened surface for the plate. Another advantage of this construction is that the solder used in filling the perforations also assists in securely retaining the plates upon the pail.

In practice, the pail is gripped between the knees of the operator in the usual manner, the roughened surfaces of the plate engaging the operator's knees, whereby he may retain the same securely in position during the milking operation.

It is thought from the foregoing, taken in connection with the accompanying drawing, that the construction and operation of my device will be readily apparent to those skilled in the art, and that slight changes in the size, shape, proportion and minor details of construction may be made without departing from the spirit or scope of the appended claims.

Having thus described my invention, I claim:

1. A receptacle having plates mounted upon the opposite sides thereof, each of the plates being outstruck at intervals to provide frusto-conical extensions on the outer face thereof, and soldering material mounted within the extensions and engaging the receptacle to hold the plates thereupon.

2. A receptacle having plates mounted upon the opposite sides thereof, each of the plates being outstruck at intervals to provide hollow extensions on the outer face thereof, and soldering material mounted within the extensions and engaging the receptacle to hold the plates thereupon.

3. As an article of manufacture, a plate adapted to be attached to a pail for the purpose described and outstruck at intervals to provide hollow extensions on the outer face, and soldering material incased in said extensions and engaging said pail and acting to hold said plate to the wall of said pail and to reinforce said extensions.

In testimony whereof I affix my signature in presence of two witnesses.

ANTHONY B. GREENFIELD.

Witnesses:
W. A. HART,
JNO. LANGDAHL.

Copies of this patent may be obtained for five cents each, by addressing the "Commissioner of Patents, Washington, D. C."